June 17, 1941.  F. E. TWISS  2,245,626
WINDSHIELD WIPER AND SIMILAR MECHANISM
Filed Sept. 28, 1937  4 Sheets-Sheet 1

Inventor,
Frank E. Twiss,
by Roberts, Cushman & Woodbury
Attys.

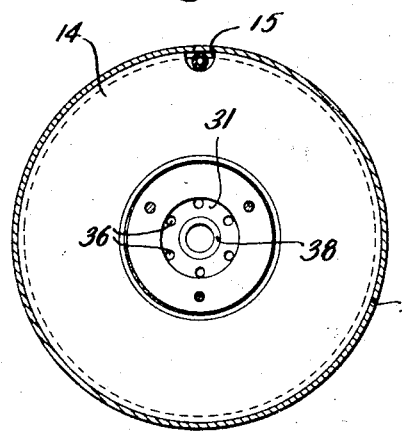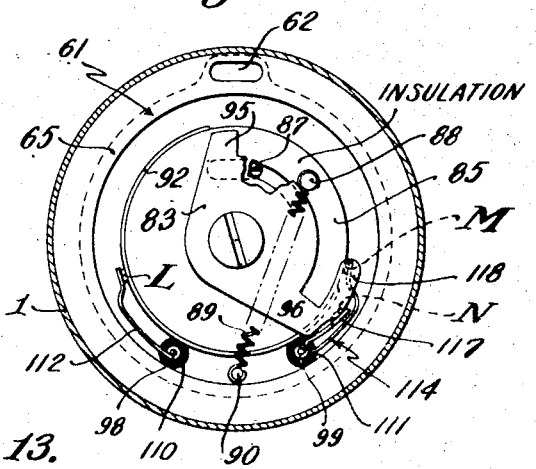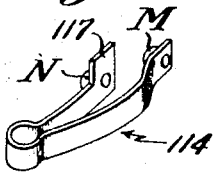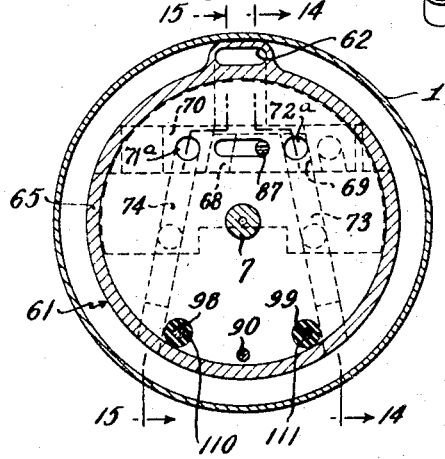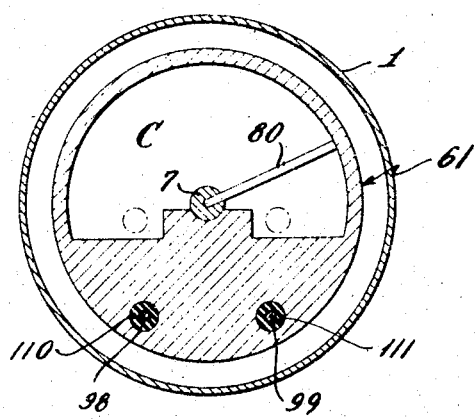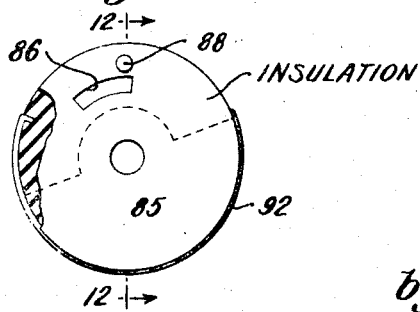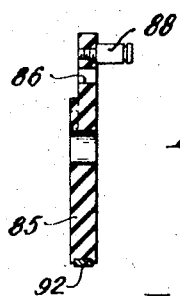

June 17, 1941.  F. E. TWISS  2,245,626
WINDSHIELD WIPER AND SIMILAR MECHANISM
Filed Sept. 28, 1937  4 Sheets-Sheet 3
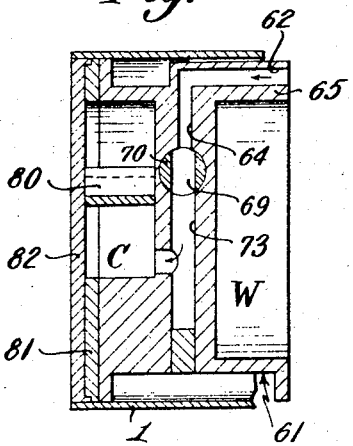
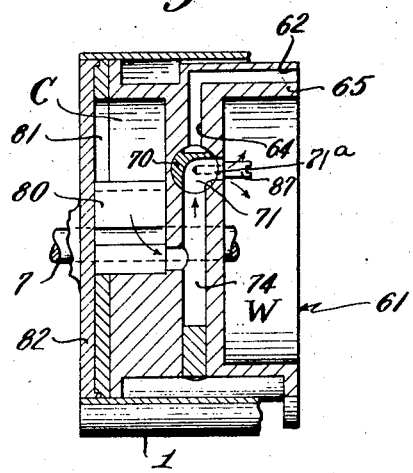
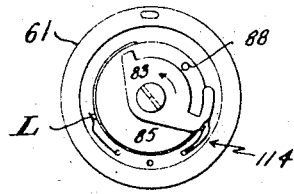
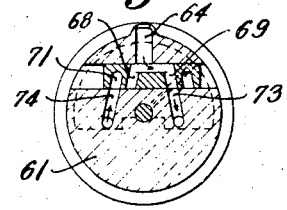
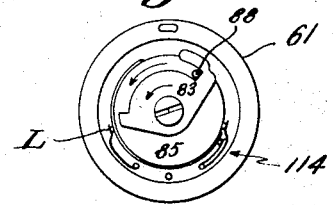
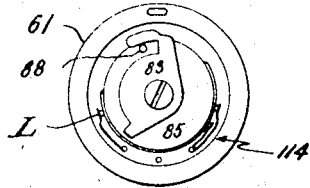
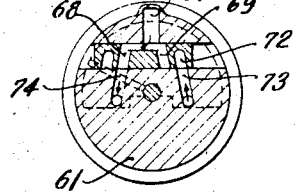
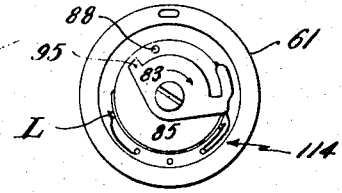
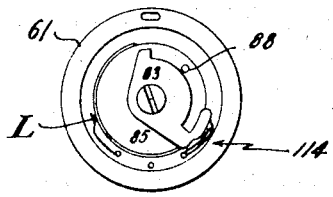
Inventor,
Frank E. Twiss,
by Roberts, Cushman & Woodberry
Attys.

June 17, 1941.  F. E. TWISS  2,245,626

WINDSHIELD WIPER AND SIMILAR MECHANISM

Filed Sept. 28, 1937  4 Sheets—Sheet 4

Inventor,
Frank E. Twiss,
by Roberts, Cushman & Woodberry
Attys.

Patented June 17, 1941

2,245,626

UNITED STATES PATENT OFFICE 2,245,626

WINDSHIELD WIPER AND SIMILAR MECHANISM

Frank E. Twiss, Taunton, Mass., assignor to F. E. Twiss Co., Inc., Boston, Mass., a corporation of Massachusetts Application September 28, 1937, Serial No. 166,066

5 Claims. (Cl. 60—52)

This invention relates more particularly to windshield wiper mechanisms or the like, which are electrically driven and controlled, although certain structural arrangements and advantageous features may be employed in other mechanisms.

Heretofore power operated windshield wiper mechanisms for motor vehicles have commonly been either of the vacuum operated type responsive to the variable vacuum in the inlet manifold of the motor, or of the electrically driven type wherein an electric motor, including a continuously revolving armature, was effective through suitable gearing in imparting an oscillating movement to the wiper blade support. The vacuum operated mechanisms have had the commonly recognized disadvantage of being subject to wide variations in speed of operation dependent upon the changes in the vacuum in the inlet manifold. Thus under certain driving conditions the rate of wiper movement became undesirably slow, resulting in serious obstruction to vision by droplets on the portion of the windshield which should be kept clean by the wiper blade. On the other hand, while electrically operated wiper mechanisms of the type referred to had a certain vogue, such mechanisms were found unsatisfactory due to the wear imposed by the reciprocating mechanical parts, the looseness developing in the gearing, and the need for lubrication which often was not attended to, with consequent wear and increase in noise of the operating mechanism, and particularly of the gearing. Furthermore, such motors were commonly supplied with commutators and brushes which were subject to wear and were not dependable over long periods of time.

The present invention affords a windshield wiper mechanism which avoids these deficiencies in the prior art, being operable at a desired optimum speed irrespective of the conditions under which the motor of the vehicle is operating and entirely independently of the vacuum in the inlet manifold, while this invention also avoids the gearing, the numerous bearings, and the commutator and brush assembly which characterized previous electrically operated windshield wipers.

To permit these desirable results, the present invention affords a simple compact wiper assembly which may include an electrical power unit which is free from parts requiring lubrication or attention. The device also includes hydraulic power transmitting means of a simple type which is effective in causing the movement of the windshield wiper support back and forth without necessity of employing gearing, oscillatory racks or the like.

In accordance with this invention, the electrical power unit may comprise electromagnetic means, preferably of the solenoid type, and may conveniently include a plunger movable within the coil and secured to a vibratory diaphragm, the diaphragm carrying one contact of a make-and-break mechanism. Such an electrical power unit is arranged so that the vibratory movement of the diaphragm and armature assembly including the plunger, results from energization of the solenoid coil, the action being similar to that provided in many electrically actuated warning signals of the vibratory diaphragm type.

Associated with the diaphragm assembly are suitable chambers and passages forming parts of the hydraulic power transmitting system, and a check valve is carried by the assembly so that, when the plunger moves in one direction, small bodies of hydraulic fluid pass through the valve, which is thereupon closed and moves in the other direction with the rest of the assembly that is thus effective in giving a slight power impulse tending to cause the circulation of the hydraulic fluid through the passages and chambers provided therefor. Since the diaphragm assembly is vibrated at a rapid rate, a substantial current of hydraulic fluid or oil is thus circulated through the various passages and chambers. One of these chambers contains an oscillating vane, one face of which receives the pressure of the current of oil so that the vane is moved in the chamber.

A suitable windshield wiper support is connected to the oscillating vane so that, as the vane is oscillated, the wiper blade itself may have a corresponding movement. In order to permit the vane and wiper support to move back and forth, suitable valve means controls the flow of the hydraulic fluid into the vane chamber so that hydraulic pressure is imposed upon one face of the vane to move it in one direction until it approaches the end of its path in that direction, whereupon the valve is actuated so that hydraulic pressure is then imposed upon the opposite face of the vane to move it in the other direction. Suitable means is associated with the vane shaft to actuate the valve at each end of the vane stroke or path so that this action automatically takes place during operation of the device.

A further advantageous feature of the invention relates to the provision of electrical control means adapted to permit the operation of the wiper or the interruption of such operation as is desired, but arranged so that the wiper support may stop at one end of its path whenever the wiper controlling switch is opened. Associated with such controlling means is an arrangement whereby, when the windshield is being cleaned, the wiper blade and its support may be manually swung to any desired position, remaining in such position until the ignition circuit of the motor is closed, whereupon the blade may automatically return to one end of its path due to momentary operation of the wiper mechanism, which occurs under such conditions even although the wiper control switch remains open.

Figure 2:
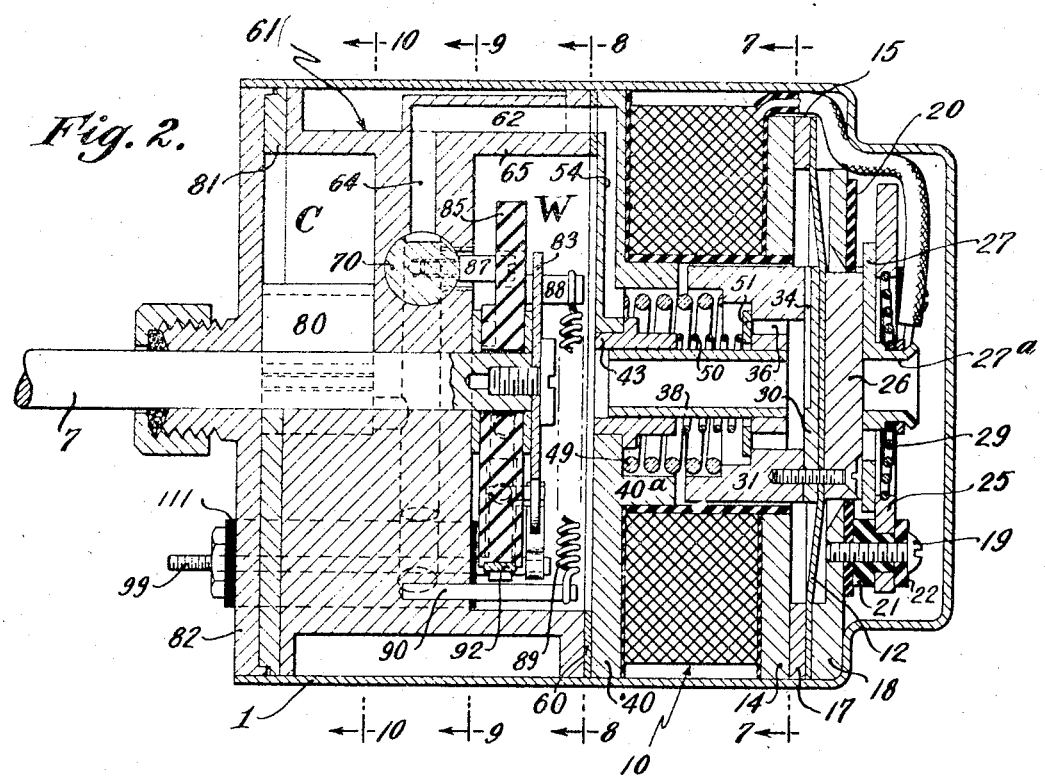
Fig. 2 is an enlarged section through the wiper operating mechanism indicated by line 2—2 of Fig. 1.
Figure 23:
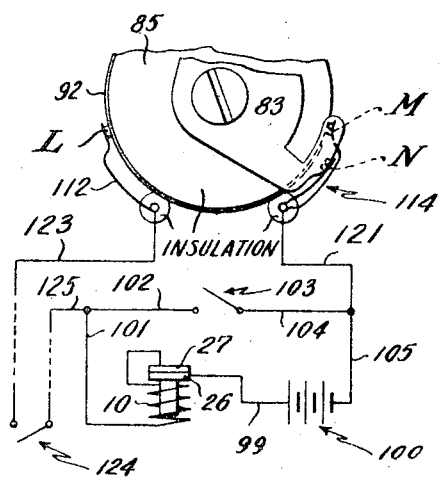
Figure 24:
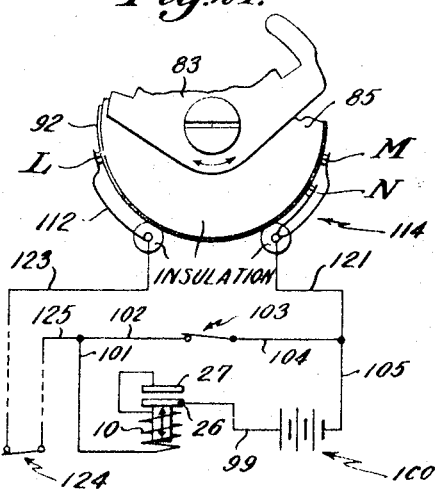
Figure 25:
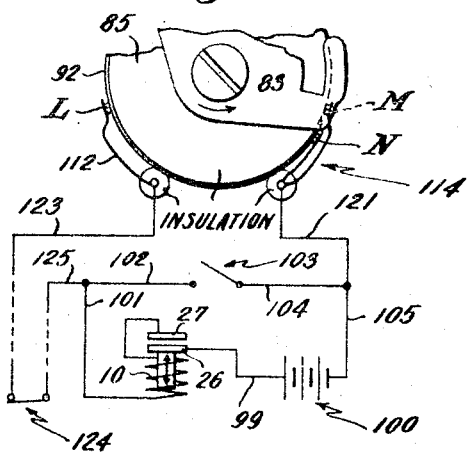

Figs. 7, 8, 9 and 10 are sections indicated respectively by lines 7—7, 8—8, 9—9, and 10—10 of Fig. 2;

Fig. 11 is an elevational detail of a portion of the valve controlling and electrical control mechanism with a part broken away and shown in section;

Fig. 12 is a section on line 12—12 of Fig. 11;

Fig. 13 is an isometric view of a contact arm employed in the apparatus and shown in Fig. 8;

Figs. 14 and 15 are sections indicated respectively by lines 14—14 and 15—15 of Fig. 9;

Figs. 16, 17, 18, 19 and 20 are elevational details, somewhat diagrammatic in character, showing certain operating conditions of parts of the apparatus;

Figs. 21 and 22 are sectional details, somewhat diagrammatic in character, showing two settings of the control valve; and Figs. 23, 24 and 25 are broken elevational views of portions of the apparatus with wiring diagrams schematically associated therewith.

A windshield wiper mechanism constructed in accordance with this invention may comprise an operating unit included in a unitary casing 1 which preferably may be mounted, for example, inside of the upper cross member 3 of a windshield 4. A wiper support 5 may be disposed outside of the windshield and may carry a conventional wiper or squeegee blade 6, the upper end of the support 5 being connected to a shaft 7 projecting from the casing 1 and extending through a suitable opening in the windshield frame member 3.

The casing 1 preferably contains an electrically energizable power unit in the form of an electromagnetic element or solenoid 10, and a suitable cooperating vibratory armature assembly. Thus the coil 10 of suitably insulated wire may be disposed near one end of the casing 1 and within the same, and a diaphragm 12 of resilient metal is disposed adjoining one end of this coil. The coil may conveniently be mounted on a conventional spool of insulating material, the tubular inner portion of this spool, however, being extended to provide a collar lying within the opening in an annular metal plate 14, which fits within the wall of the casing 1, which preferably may be of cylindrical form. The member 14 preferably may have a small opening 15 adjoining its periphery, as shown in Fig. 7, through which the wire for energizing the coil 10 may extend from the make-and-break mechanism which is in the rear extremity of the casing 1.

The annular member 14 has in juxtaposition thereto a clamping washer 17 which engages one marginal face of the resilient metal diaphragm 12, while a suitable annular member 18 engages the opposite marginal face of the diaphragm. The member 18 is provided with an inwardly extending flange supporting a screw 19; this screw secures a washer 20 of insulating material against the face of member 18 and secures a spacer 21 of such material and an overlying washer 22 of similar material in such a manner as to clamp an annulus 25 in spaced parallel relation to the member 18. Secured to the diaphragm 12 is a metal contact disk 26 which is engageable with the contact plate 27 of the make-and-break mechanism. A flat spiral spring 29 is supported by the annulus 25 and is secured to a collar-like extension 27a of the member 27 to support the latter. Thus in the normal inactive position of these parts shown in Fig. 2, the contact disk 26 is engaging the contact plate 27, the spring 29 being slightly stressed under these conditions to constantly urge the contact plate 27 to the right, as viewed in Fig. 2. Movement of the contact plate in such direction is limited by its engagement with the annulus 25; so that the circuit for the solenoid 10 may be closed and the latter may then be energized. Thereupon, when the center of the diaphragm 12 moves towards the solenoid, the members 26 and 27 are separated and the circuit is broken.

The diaphragm 12 has a disk 30 secured to its inner face, and a cup member 31 is secured to the disk 30 and forms the plunger of the armature assembly. A restricted passage 34 is provided in the disk 30 so that oil can pass into and out of the space between the diaphragm 12 and the member 14. The end wall of the cup member 31 has a plurality of openings 36 therein (Fig. 7), and a tube 38 is fitted within an opening in the central part of this end wall.

The device is provided with a wall member 40 which is disposed at the inner end of the solenoid coil and supports an inner collar 43 in telescoping engagement with or juxtaposition to the end of the tube 38. The wall member 40 also provides a collar portion 40a which fits within the inner end of the tubular part of the insulating spool of the solenoid 10, it being noted that the end of the collar portion 40a and the edge of the annular wall of cup 31 are normally separated by a clearance space, as shown, the width of this clearance space being reduced when the member 31 is magnetically pulled inwardly by the solenoid 10.

A relatively heavy coiled compression spring 49 is disposed between the wall 40 and a shoulder on the cup member 31, thus tending to urge that member and the central portion of the diaphragm away from the solenoid coil. A very light coil spring 50 is disposed between the end of the tube 43 and a flat annular washer 51, which is normally held by the spring 50 over the inner ends of the openings 36 in the end wall of the cup member 31. Thus the washer 51 forms a check valve which tends to be held in closed position by the light spring 50.

The wall member 40 is provided with a radial passage or duct 54 communicating at its inner end with the space surrounding the tubes 38 and 43 and in which the springs 49 and 50 are located.

A sealing washer 60 of slightly compressible material, e. g., paper stock, is disposed between the face of the wall member 40 and an annular surface of a casting member 61, there being an opening through this washer which communicates with the outer end of the radial passage 54 in the wall 40, and with a longitudinal passage 62 in the casting 61 (see Fig. 9). The casting 61 affords a cup-like portion including a cylindrical wall section 65 which cooperates with the wall 40 in substantially enclosing an oil-containing chamber W. This chamber communicates, however, with the passages 36 by means of the openings provided in the telescoping tubes 38 and 43 previously described.

Figure 1:
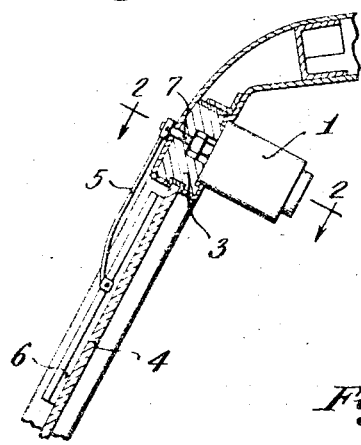
Fig. 1 is a sectional view of a portion of the windshield and front header of a motor vehicle with my improved windshield wiper mechanism shown in elevation as mounted thereon.
Figure 3:
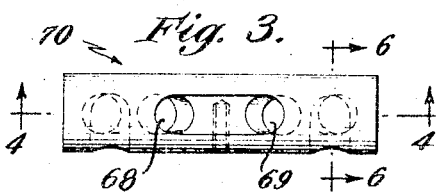
Fig. 3 is a plan view of the control valve member of the hydraulic power transmitting mechanism.
Figure 4:
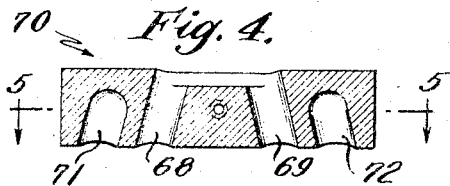
Fig. 4 is a section on line 4—4 of Fig. 3.
Figure 5:
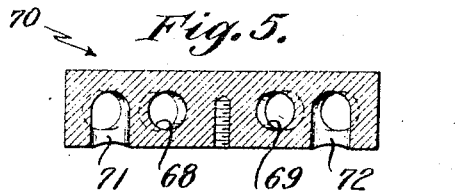
Fig. 5 is a section indicated by line 5—5 of Fig. 4.
Figure 6:
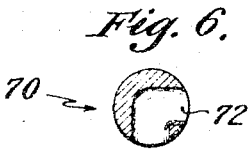
Fig. 6 is a section on line 6—6 of Fig. 3.

The passage 62 communicates with a duct 64 formed in the casting 61 (Figs. 2 and 14) while the other end of the duct 64 communicates with one or the other of two supply passages 68 and 69 in the slidable valve 70 (Fig. 4.) The valve 70 comprises a cylindrical member with the passages 68 and 69 drilled through the same and with right-angled outlet passages 71 and 72 at its outer ends. When the valve is in one position, shown in Figs. 9 and 21, the supply passage 69 registers with a duct 73 in the casting 61 which communicates with the vane chamber C and the outlet passage 71 communicates with a passage 74 in casting 61, which in turn communicates with the opposite side of the vane chamber C. When the valve 70 is moved to the opposite end of its path (Fig. 22), the supply passage 68 communicates with the passage 74 while the outlet passage 72 communicates with the passage 73. The outlet passages 71 and 72 are arranged to discharge oil from the vane chamber C therethrough to the chamber W (Fig. 15) through passages 71ᵃ and 72ᵃ, respectively, in the forward wall of the chamber W. The oil thus discharged into the chamber W is free to flow through the tube 38 to the inlet side of valve 51.

The end of the casting 61 is provided with a hollow portion defining the major part of the chamber C (Figs. 10 and 14), while a spacer plate 81 (Fig. 2) fits in registration with the end of the casting and is in turn engaged by the end wall 82 of the device. A portion of this wall member 82 provides one side wall of the chamber C. The shaft 7 extends through the vane chamber C and through wall member 82, and an oscillating vane 80 is secured to this shaft, having a substantially fluid-tight engagement with the walls of the chamber. Accordingly when oil is admitted to one side of the chamber C and passes out of the other side of the chamber, the vane moves from the first side of the chamber toward the second side thereof. When this oscillatory movement in one direction has been completed, the position of the valve 70 is altered so that the direction of flow of oil into and out of the chamber C is reversed and the vane 80 moves in the opposite direction.

Suitable mechanism is provided to actuate the valve 70 at each end of the stroke of the vane. For this purpose the shaft 7 extends into the chamber W and carries a control plate 83 fixed thereto, while an insulating disk 85 is loosely mounted on the shaft 7 adjoining the plate 83, being spaced therefrom by a suitable spacing washer. The disk 85 is shown more particularly in Fig. 11 and is provided with a rather short arcuate slot 86 which receives the end of a pin 87 (Figs. 2 and 8) projecting from the valve body 70, it being understood that the pin fits loosely within the slot. The insulating disk 85 is also provided with a pin 88 fixed thereto and engaged by one end of a tension spring 89, the opposite end of which is supported by a stud 90 projecting from the casting 61.

The disk 85 is also provided with an arcuate contact strip 92 which extends about more than half of its periphery, as shown, for example, in Fig. 11. The control plate 83 is provided with arms or lugs 95 and 96 which engage the pin 88 as the plate 83 moves toward one end or the other end of its oscillatory path corresponding to the oscillatory path of the vane 80. The lugs 95 and 96 engage the pin 88 to cause the disk 85 to move with the plate 83. This movement continues until the pin 88 is moved to the maximum distance from the pin 90, i. e., to the uppermost point of its arcuate path as viewed in Fig. 8, whereupon the spring 89 is effective in snapping the disk 85 over center, so that the disk is moved to the position shown in Fig. 16 or that shown in Fig. 20. As such a movement occurs, relative movement takes place between the disk 85 and the pin 87, so that one or the other end of slot 86 engages the pin 87 to cause the movement of the pin and the valve 70, thus reversing the position of the latter. Thereupon the vane 80, the shaft 7 and the control plate 83 move in the opposite direction, this movement continuing until a lug 95 or 96 on the plate 83 engages the pin 88, whereupon the insulating disk 85 is again snapped over center by the spring 89 and the position of the valve 70 is again changed.

When the device illustrated herein is in its normal operative condition, the spaces within the hydraulic power transmitting means afford a closed system filled with oil. Thus these spaces include the chamber C, the passages 73 and 74 extending therefrom, the passages 68, 69, 71 and 72 in the valve 70, the passages 62 and 64 in the casting 61, the passage 54 in the wall member 40, and the chamber W. The oil-containing portion of the device also includes the interior portions of the interfitting tubes 38 and 43, the space between the end wall of the cup member 31, and the disk 30, the openings 36 in the end wall of the cup member, and the space surrounding the tubes 38 and 43 in which the springs 49 and 50 are located. The passage 34 permits oil to pass into and out of the space between the annular member 14 and the adjoining part of the diaphragm, it being understood that as the diaphragm is vibrated the capacity of this chamber changes appreciably. Obviously the diaphragm in effect affords a distortable wall for the oil-containing part of the device.

Obviously when the member 31 moves rapidly away from solenoid 10 under the action of the spring 49, the inertia of the washer 51 and the resistance to its movement caused by the oil body disposed at both sides thereof, causes the washer to lag behind the cup member 31, so that the check valve provided by these parts is opened, and a certain amount of oil passes through the passages 36 in the moving body 31. At the end of this outward stroke of the member 31, the light spring 50 causes the washer 51 again to engage the end wall of the member 31, so that the oil which has moved through the passages 36 is trapped at the left-hand side of the member 31, as viewed in Fig. 2; accordingly, during the next inward movement of the diaphragm and the member 31, some oil from this chamber flows through the ducts 54 and 62. Since the vibratory movement of the diaphragm and member 31 occurs with extreme rapidity, there is an appreciable circulation of oil through the above-named passages and the valve 70 into the chamber C.

The plate 85 with its arcuate contact strip 92 also forms part of the electrical control system for the apparatus. This control system can best be understood by reference to the wiring diagrams shown in Figs. 23, 24 and 25. The contact disk 26 may be connected by a lead or conductor 99 to the battery 100 while the contact plate 27 of the make-and-break mechanism is connected to one end of the solenoid 10, the opposite end of which is connected through leads 101 and 102 to the control switch 103 for the wiper mechanism, which may be located at any convenient point as, for example, adjoining the wiper casing or upon the instrument board of the vehicle. The switch 103 is connected by leads 104 and 105 to the battery 100 so that when the switch 103 is initially closed, current can flow from the battery through lead 99 to contact plate 26, thence through contact plate 27, the solenoid 10, leads 101 and 102 to the control switch 103, and from the latter through leads 104 and 105 back to the battery.

Obviously when the circuit is closed in this manner, the coil 10 is energized and the plunger or cup 31 is drawn inwardly, i. e., to the left as viewed in Fig. 2, against the action of spring 49, while the contacts 26 and 27, which are formed of magnetic material and are, therefore, magnetically held together for equal movement against the force of the spring 29 when the coil 10 is energized, move inwardly together until the contact 27 engages washer 20, the contact 26 thereby being separated from contact 27. The contact 27 is thereupon returned to the limit of its movement to the right, as viewed in Fig. 2, under the influence of the spring 29. Thus the electrical circuit is momentarily broken. Thereupon the spring 49 cooperates with the resilient diaphragm 12 in causing the cup 31 to move in the opposite direction, i. e., toward the right as viewed in Fig. 2, reestablishing contact between plates 26 and 27 and causing reenergization of the solenoid coil 10 whereupon the operating cycle is repeated, it being understood that in practice the armature cup and diaphragm vibrate rapidly.

The contact plates 26 and 27 have surfaces of substantial area which engage each other to close the electrical circuit, for example, these areas may be at least of the order of one-eighth of the area of the diaphragm within the clamping rings and preferably may be nearer one-quarter of said area. Accordingly, pitting is avoided, and accordingly this make-and-break mechanism may have an exceedingly long operative life.

Obviously the arrangement so far described permits controllable energization of the solenoid as desired, or opening of the solenoid circuit so that the electrical power unit is no longer energized. However, if such an arrangement alone were depended upon, the vane 80, the shaft 7 and the windshield wiper support 5 might stop at any point in the oscillatory path of these parts. Thus, for example, the windshield wiper blade 6 might stop where it would interfere with the vision of the driver of the vehicle. It is generally recognized that it is desirable to stop the blade at one end of its path, so that, for example, it may be juxtaposed to the upper frame of the windshield.

To permit this desirable result, the electrical control system is provided with a circuit portion parallel to the switch 103, so that the energization of the electrical power unit can continue for a short period after that switch is opened and until the blade support 5 is brought to one end of its path, whereupon this parallel circuit portion is automatically broken. For this purpose conducting rods 98 and 99 extend through the casting 61 from the front of the device, being supported in insulating tubes 110 and 111. The inner ends of the rods 98 and 99 support metal arms 112 and 114, respectively. The arm 112 carries a contact L which constantly engages the strip 92 (Fig. 8) on the insulating disk 85 in all positions of the disk, while the contact arm 114 is of bipartite construction, as shown particularly in Fig. 13, and carries two spaced contacts M and N which are resiliently held in engagement with the contact strip 92 of the disk 85 during the major portion of the path of the disk. The portion of the arm 114 which carries the contact N is provided with a lug 117 which is engageable with the edge of an extension 118 of the lug 96 of control plate 83 so that, for example, when the plate occupies the position shown in Fig. 8, the contact N is lifted from the strip 92. On the other hand, the contact M is arranged so that it rides off the end of the contact strip 92 as the disk 85 nears its extreme position, shown in Fig. 8.

Now referring again to the wiring diagram shown in Figs. 23 to 25, it will be noted that the contacts M and N are electrically connected through arm 114 by leads 121 and 105 to one side of the battery 100, while the contact L may be electrically connected through a lead 123 to the ignition switch 124 of the vehicle, which in turn is connected by a lead 125 to the lead 101 and thus to the solenoid coil 10. Accordingly during the major portion of the path of movement of the insulating disk 85 current may flow from the battery 100 through the lead 99, the contacts 27 and 26 (assuming that these contacts are in engagement), the coil 10, the leads 101 and 125, and the switch 124 (assuming this switch to be closed), the lead 123, the contact L, the contact strip 92, and in parallel through the contacts M and N and thence through the bipartite arm 114 to the leads 121 and 105 and then to the opposite side of the battery.

Obviously the contacts M and N continue thus to engage the strip 92 even when the disk 85 is at one end of its path, shown for example in Fig. 17. When, however, the control plate 83 moves in the direction indicated by the curved arrow in Fig. 20, the lug 95 on this plate approaches and engages the pin 88 on the disk, and accordingly the pin 88 is moved to its uppermost position, whereupon the spring 89 is effective in causing the disk to snap to the position shown in Figs. 8 and 18.

As the plate 83 approaches its position shown in Fig. 8, its cam-like extension 118 engages the lug 117 of the bipartite arm 114, lifting the corresponding contact N from the strip 92. During the first part of this fraction of the operating cycle the contact M may continue to engage the strip 92. However, when the disk 85 is snapped over its center position by the spring 89, the strip 92 moves out of engagement with the contact M as the disk rapidly approaches this end of its path. Obviously this occurs as the vane 80 and the wiper support 5 are practically at one end of their oscillatory path. Under these conditions, it is evident that the circuit through the leads 123 and 121 is broken so that operation of the power unit is thus interrupted, if the switch 103 has been opened. Accordingly no matter what the position of the vane 80 and the support 5 when the switch 103 is opened, the power unit will continue to operate unless or until the plate 85 has reached the approximate position indicated in Fig. 8.

Obviously should the switch 103 happen to be opened just as the plate has reached this position, the operation of the power unit will immediately be terminated. Should the control switch 103 be opened just as the control plate 83 starts away from the position shown in Fig. 8, i. e., is moving in the direction of the curved arrow shown in Fig. 16, the operation of the power unit will be immediately interrupted unless the plate 83 has moved far enough to permit the contact N to return into engagement with the strip 92. If this has occurred the parallel circuit portion is closed and the mechanism will complete substantially an entire cycle until the plate 83 and disk 85 again reach the positions shown in Fig. 8.

It is thus evident that when the switch 103 is opened when the parts 85 and 83 are near the positions shown in Fig. 8, the further operation of the power unit is prevented if the switch is opened after the disk 85 has been snapped to the position shown in Fig. 8 and before the plate 83 has moved sufficiently to permit the contact N to resume engagement with the strip 92. Thus under any operating condition the vane 80 and the wiper support 5 are stopped in a position which is substantially at the extreme end of the oscillatory path, the maximum possible spacing from this extreme position being determined by the angular movement of the plate 83, which suffices to cause the movement of contact N into and out of engagement with the strip 92.

While the leads 123 and 125 might be connected directly together in order to permit operation of the electrical control system in this manner, I prefer to connect these leads through the ignition switch 124 so that the wiper and the wiper blade support 5 can be manually moved to any desired position when the motor ignition is cut off and, for example, the windshield is being cleaned. Under such conditions the blade will remain in the position to which it was moved until the ignition switch 124 is closed, whereupon the circuit will be closed through leads 123 and 121, causing the electrical power unit to operate until the blade has reached the desired inoperative position, unless, of course, the blade has been left in this position.

It will of course be understood that the electrical connections shown in Figs. 23, 24 and 25 are diagrammatic in character and that in practice, for example, the contact arms 112 and 114 are connected to the remainder of the electrical circuit through the rods 98 and 99 and that other portions of the circuit may be provided by suitable metallic parts of the device or of the vehicle to which is is secured or by wiring not specifically illustrated herein.

Furthermore, it will be evident that the circuit for the magnetic field comprises the cup-like member 31, the plate 30, the diaphragm 12, the annular members 14 and 17, a portion of the wall of casing 1 and the member 40 with its collar-like extension 40ª. The part 40ª in effect affords a partial core member for the magnetic coil 10, so that the electrical unit partakes partially of the nature of a conventional solenoid assembly and partially of the nature of a conventional electromagnet assembly, the plunger 31 having the function both of the plunger of a solenoid and of the armature of an electromagnet.

In the normal operation of a windshield driving mechanism of this character, it is evident that when the coil 10 is energized the armature cup 31 is moved back and forth rapidly and a corresponding rate of vibration is imparted to the diaphragm 12 which forms a distortable wall for the oil-containing portion of the apparatus. When the cup moves away from its innermost position under the action of the heavy spring 49, the inertia of the washer 51 and the pressure of the oil imposed through the openings 36 tend to cause the washer to lag behind the armature cup 31 so that the check valve provided by the washer 51 is opened and a certain amount of oil passes to the side of the cup adjoining this washer. When the cup 31 is near the outer end of its path, it is reengaged by the washer 50 so that the valve is closed after a certain additional amount of oil has been trapped upon that side of the cup. Thus as the cup moves inwardly, there is a tendency for the oil to be pumped through the passages 54, 62 and 64 and through either the supply passage 68 or the supply passage 69 of the valve 70 and thence through either the passage 74 or 73 of the casting 61 and into the corresponding side of the chamber C. Since the vibration of the cup 31 occurs at high speed, a constant current of oil is circulated in this manner into the chamber C, imposing pressure upon one side of the blade 80 and causing movement of the same, the shaft 7, and the wiper support 5. As the blade is moved in this manner, it presses oil out of the opposite side of the chamber C to replace oil which passed from the chamber W and from the interior of the interfitting tubes 43 and 49 through the check valve.

Obviously when the shaft 7 and the vane 80 approach one end or the other of their oscillatory path, the valve 70 is reset by means of the control plate 83 and the insulating disk 84, as has been described, so that the direction of oil flow into the chamber C is reversed, thus causing the movement of the vane 80 in the opposite direction. Thus the direction of movement of the vane is automatically reversed as it approaches each end of it path. It is evident, as has been described, when the control switch 103 is opened, the operation of the mechanism will continue unless or until the blade support 5 and the blade 6 have reached one end of their oscillatory path, when the contacts M and N are both out of contact with the contact strip 92, whereupon the operation of the electrical power unit is interrupted.

It is evident that the present invention affords a mechanism particularly suitable for actuating a windshield wiper, although I am aware that such mechanism may also be advantageously employed for various other purposes. In the preferred windshield wiper arrangement the electromagnetic unit may operate independently of the speed of the motor of the vehicle or of the degree of vacuum in the inlet manifold thereof. However, the electromagnetic unit avoids the troublesome commutators and brushes which have heretofore been employed in electrically driven wipers, while the contact plates afforded by the present invention permit the provision of a make-and-break mechanism which has a very long operative life without necessity for attention or replacement of parts.

Furthermore, the arrangement of the hydraulic power transmitting system permits the electromagnetic unit to be effective in imparting an oscillatory movement to the wiper support or the like without necessity for providing gears, rack and pinion constructions, or the like, so that the provision of numerous rapidly wearing mechanical parts is avoided and the necessity or desirability of lubrication of such parts is eliminated.

The present invention also affords a simple and convenient control arrangement wherein the control for the valve which directs the operating fluid to opposite sides of the vane is associated with a portion of the electrical circuit, so that when the control switch for the wiper is opened the movement of the wiper support is automatically continued until the wiper stops at one end of its path.

I claim:

1. Mechanism of the class described comprising a casing, an electro-magnetic power unit in said casing, a vibratory pumping member, a check valve carried by said member, a liquid-containing system within the casing enclosing said pumping member and valve, said member and valve being actuable in response to energization of the unit to cause circulation of liquid through the system, said system including a vane chamber, a vane in said chamber, means including a valve to direct the liquid first against one surface of the vane and then against an opposite surface thereof to cause the vane to move back and forth in said chamber, an oscillating shaft extending from the chamber and secured to said vane, a part movable by said shaft as the vane approaches each end of its path to actuate the last-named valve with a snap action, an electric circuit for energizing said unit, said circuit including a control switch and including a circuit portion parallel to said switch for causing the continued operation of the unit until the vane reaches one end of its path should the control switch be opened when the vane is not at the said one end, said parallel circuit portion including a pair of contacts one of which is carried by said part and disengages the other contact when said part is moved with a snap action beyond a certain point in one direction.

2. Mechanism of the class described comprising a casing, an electro-magnetic power unit in said casing, a vibratory pumping member, a check valve carried by said member, a liquid-containing system within the casing enclosing said pumping member and valve, said member and valve being actuable in response to energization of the unit to cause circulation of liquid through the system, said system including a vane chamber, a vane in said chamber, means including a valve to direct the liquid first against one surface of the vane and then against an opposite surface thereof to cause the vane to move back and forth in said chamber, an oscillating shaft extending from the chamber and secured to said vane, an electric circuit for energizing said unit, said circuit including a control switch and a circuit portion parallel to said switch for causing the continued operation of the unit until the vane reaches one end of its path should the control switch be opened when the vane is not at the said one end, said parallel circuit portion including a pair of normally engaged contacts, a part movable with a snap action as the vane approaches that said end of its path, said part carrying one of said contacts so that when the vane is at that end of its path and the part is thus moved, the contacts are separated and the operation of the mechanism stops if the said control switch has been opened.

3. Mechanism of the class described comprising a casing, an electromagnetic power unit in said casing, a vibratory pumping member, a check valve carried by said member, a liquid-containing system within the casing enclosing said pumping member and valve, said member and valve being actuable in response to energization of the unit to cause circulation of liquid through the system, said system including a vane chamber, a vane in said chamber, means including a valve to direct the liquid first against one surface of the vane and then against an opposite surface thereof to cause the vane to move back and forth in said chamber, an oscillating shaft extending from the chamber and secured to said vane, an electric circuit for energizing said unit, said circuit including a control switch and including a circuit portion parallel to said switch for causing the continued operation of the unit until the vane reaches one end of its path should the control switch be opened when the vane is not at the said one end, means movable with said shaft, a part engageable by said means as the latter approaches each end of its path, a spring to cause the snap action of the part when thus engaged by said means so that the part thereupon remains in the position to which it was snapped until again engaged by said means, said parallel circuit portion including a pair of normally engaged contacts one of which is carried by said part whereby, when it thus snaps to said position, the contacts are operated.

4. Mechanism of the class described comprising a casing, an electromagnetic power unit in said casing, a vibratory pumping member, a check valve carried by said member, a liquid-containing system within the casing enclosing said pumping member and valve, said member and valve being actuable in response to energization of the unit to cause circulation of liquid through the system, said system including a vane chamber, a vane in said chamber, means including a valve to direct the liquid first against one surface of the vane and then against an opposite surface thereof to cause the vane to move back and forth in said chamber, an oscillating shaft extending from the chamber and secured to said vane, an electric circuit for energizing said unit, said circuit including a control switch and including a circuit portion parallel to said switch for causing the continued operation of the unit until the vane reaches one end of its path should the control switch be opened when the vane is not at the said one end, means movable with said shaft, a part engageable by said means as the latter approaches each end of its path, a spring to cause the snap action of the part when thus engaged by said means so that the part thereupon remains in the position to which it was snapped until again engaged by said means, said parallel circuit portion including a pair of normally engaged contacts one of which is carried by said part whereby, when it thus snaps to one end of its path, the contacts are separated said parallel circuit portion including a second pair of normally engaged contacts parallel to the last-named pair of contacts, said second pair being separated and restored to normal engagement by said means as it approaches and leaves respectively one end of its path, whereby the parallel circuit portion is closed by the second pair while said part remains in said position, as the said vane is moved away from the end of its path.

5. Mechanism of the class described comprising a casing, an electromagnetic power unit in said casing, a pumping member adapted to be reciprocated by said power unit, a fluid circulating system in which system said pumping member is located, check valve means cooperating with said pumping member to control the direction of flow of fluid in said system under the influence of said pumping member as actuated by said power unit, said system including a vane chamber, a vane in said chamber, valvular means for directing fluid under pressure in said system first against one surface of said vane and then against the opposite surface thereof while exhausting fluid from the respectively opposite faces thereof whereby to cause oscillation of said vane, a shaft extending from said chamber and secured to said vane for oscillation therewith, an electric circuit for energizing said power unit, said circuit including a control switch and including a circuit portion parallel to said switch for causing continued operation of the unit until the vane reaches one end of its path of movement should the control switch be opened when the vane is midway of such path, means movable with said shaft, a part engageable with said movable means as the latter approaches each end of its path, a spring to cause a snap action of said part when thus engaged by said movable means so that said part thereupon remains in the position to which it was snapped until again engaged by said movable means, a connection between said part and valvular means for effecting simultaneous operation thereof, and a pair of normally engaged contacts in said parallel circuit portion one of which is positioned for engagement with said snap action mechanism when the latter is in one of its extreme positions of movement whereby to move it to open circuit position.

FRANK E. TWISS.